(12) United States Patent
Reichow (10) Patent No.: US 8,282,214 B2
(45) Date of Patent: Oct. 9, 2012

(54) DISPLAY SYSTEM USING PROJECTION SCREENS FORMED OF FLOWING SNOW

(75) Inventor: Mark A. Reichow, Valencia, CA (US)

(73) Assignee: Disney Enterprises, Inc., Burbank, CA (US)

(*) Notice: Subject to any disclaimer, the term of this patent is extended or adjusted under 35 U.S.C. 154(b) by 299 days.

(21) Appl. No.: 12/782,758

(22) Filed: May 19, 2010

(65) Prior Publication Data

US 2011/0285964 A1    Nov. 24, 2011

(51) Int. Cl.
  *G03B 21/00* (2006.01)
  *G03B 21/32* (2006.01)
  *A63J 5/02* (2006.01)
  *A63G 31/00* (2006.01)
(52) U.S. Cl. ............... 353/10; 353/122; 352/85; 472/61
(58) Field of Classification Search .................. 353/122, 353/10, 28; 359/443, 446; 239/18, 14.2; 352/85, 86; 472/61
See application file for complete search history.

(56) References Cited

U.S. PATENT DOCUMENTS

| | | | | |
|---|---|---|---|---|
| 2,676,471 A | * | 4/1954 | Pierce, Jr. ........................ | 62/74 |
| 2,968,164 A | * | 1/1961 | Hanson ............................ | 62/74 |
| 3,610,527 A | * | 10/1971 | Ericson et al. ................ | 239/2.2 |
| 4,202,496 A | * | 5/1980 | VanderKelen et al. ...... | 239/14.2 |
| 4,214,700 A | * | 7/1980 | Vanderkelen et al. ........ | 239/2.2 |
| 4,667,481 A | | 5/1987 | Watanabe et al. | |
| 5,167,367 A | * | 12/1992 | VanderKelen et al. ........ | 239/2.2 |
| 5,368,228 A | * | 11/1994 | Adamson et al. .............. | 239/18 |
| 5,379,937 A | * | 1/1995 | Rothe ........................... | 239/14.2 |
| 5,400,966 A | * | 3/1995 | Weaver et al. ................. | 239/2.2 |

(Continued)

FOREIGN PATENT DOCUMENTS

| JP | 4325188 A | 11/1992 |
|---|---|---|
| JP | 2001243818 A | 9/2001 |

OTHER PUBLICATIONS

Plishka, Michael, "Animated Snow Projections," www.trendhunter.com/trends/australian-snow-projections-light-dancing-upon-snowy-canvas, Dec. 8, 2008.

(Continued)

Primary Examiner — William C Dowling
Assistant Examiner — Ryan Howard
(74) Attorney, Agent, or Firm — Marsh Fischmann & Breyfogle LLP; Kent A. Lembke (57) ABSTRACT

A display system for use in winter and other low temperature venues. The system includes a projection screen generation assembly that includes a snow making machine. The snow making machine receives an input flow of a liquid, such as water plus one or more additives to increase opacity and/or reflectivity of the snowflakes. The machine forms snow from the input flow and discharges a volume of flowing snow as a sheet or curtain providing a projection screen. The system includes a high-brightness projector directing light onto the projection screen to provide an image on surfaces of the flowing snow. In some embodiments, the snow making machine includes a nozzle configured such that the flowing snow is output in a substantially planar sheet, e.g., with the use of a diffuser or the like for increasing the laminar nature of the flow and the sheet may be relatively thin.

19 Claims, 5 Drawing Sheets

U.S. PATENT DOCUMENTS

| | | | | |
|---|---|---|---|---|
| 5,836,514 A | * | 11/1998 | Handfield | 239/14.2 |
| 6,032,204 A | * | 2/2000 | Huff et al. | 710/23 |
| 6,129,290 A | * | 10/2000 | Nikkanen | 239/2.2 |
| 6,793,148 B2 | * | 9/2004 | Ratnik | 239/2.2 |
| 7,290,722 B1 | * | 11/2007 | Ewald | 239/14.2 |
| 2008/0239243 A1 | * | 10/2008 | Hasegawa et al. | 353/30 |

OTHER PUBLICATIONS

Hutchison, Jim, "The Big Picture: The Harbin International Ice and Snow Sculpture Festival," www.jimonlight.com/2009/01/18/the-big-picture-the-harbin-international-ice-and-snow-schulpture-festival/, Jan. 18, 2009.

* cited by examiner

DISPLAY SYSTEM USING PROJECTION SCREENS FORMED OF FLOWING SNOW

BACKGROUND

1. Field of the Description

The present description relates, in general, to visual display and projection systems, and, more particularly, to a method and system for projecting still and video images onto one or more curtains or screens formed of snow.

2. Relevant Background

There is a growing demand for providing entertainment in outdoor settings such as in large city parks, amusement or theme parks, sporting events, outdoor musical concerts, and other settings in which large numbers of people gather. For example, it is well known to provide laser or light-based projections as part of music concerts. In other cases, it is popular to provide a fireworks show to entertain a crowd after a baseball, soccer, or football game or in a park setting. In many cases, it is desirable to create a show that is so unique and exciting that people are visiting a facility or venue in large part or solely for the outdoor show.

One particular challenge in this context is how to provide shows or otherwise entertain visitors outdoors during the winter months. For example, many ski resorts will provide fireworks as part of night skiing or to otherwise entertain their visitors after the ski hill shuts down for the evening so as to retain the visitors near businesses. During winter olympics and other winter sporting events it is common to set up large conventional movie screens or electronic display devices to display still or video images, e.g., to show entertaining and advertising-related videos or the like. Often, though, winter entertainment may be limited to music played from loudspeakers mounted outside restaurants and other gathering places such as skating rinks or lower portions of ski hills.

SUMMARY

Briefly, the following description teaches systems and methods for projecting on flowing curtains or sheets of snow (i.e., frozen or partially frozen water or other liquid particulates). The inventor recognized that unique visual displays could be achieved by projecting upon snow due to its color (e.g., white) and its reflectivity. Presently, media projection onto sprayed water from fountains provides interesting and, often, large-scale entertainment spectaculars and shows for outdoor venues such as theme parks, hotels, and resorts. However, it is believed that significantly better quality and/or differing visual effects are achievable with the use of projection screens generated with snow. The flowing-snow projection screens can be readily and inexpensively generated in nearly any outdoor winter or cold-weather setting such as a winter resort (e.g., on a snow covered mountain side), sport venue, or a park setting during winter months (e.g., with temperatures below some maximum value such as about freezing temperatures).

Specifically, snow particles reflect more light than water-mist particles. The reason light is reflected off of water-mist curtains has to do with the amount of air that is mixed with the water as it is ejected through fountain nozzle orifices. The "white" frothiness of the water particulates illuminates as light strikes them and/or reflects light. In contrast, and as a likely improvement, a snowflake or frozen liquid particulate is a solid (or at least more solid than misted water as it may be partially frozen in some cases), and, as a result, snow produces a higher screen gain than a liquid mist particle, which causes it to be a desirable material for creating a projection screen (or projection surface on a curtain or sheet of flowing snow).

A display system can be provided with a snow projection screen to create a new, world-class venue of wintertime entertainment. The projection screen may be formed from a constant or variable flow of snow outputted from a nozzle (with or without a laminar flow diffuser) of a snow making machine/snow maker (from a projection screen generation assembly). In some applications, commercial/industrial snow makers would be modified to produce a dense and adjustable laminar curtain of snow, and the snow particles may be optimized by adjusting operating parameters and/or components of the snow maker to produce snow particles optimized for a particular effect such as having higher reflectivity (which may be defined or set by the size of the particle, density of particles in respect to each other, and/or by the particle structure all of which may, in some cases, be adjusted with the mister settings, air flow, and/or temperatures). In a typical evening/night (or low light level) show, a projector(s) is then used to project still and/or video images onto a projection surface of the flowing-snow projection screen.

The projection screen generation assembly may be packaged as an assembly of components (e.g., water mister or nozzle arrays, high velocity fan(s), air-shaping plenum, outlet nozzle, diffuser, and the like). In some applications, the assembly may be mounted for articulation (e.g., positionable in the X-Y axes) to control the location of a flowing-snow projection screen within a given space. A controller may be provided to selectively operate the projector(s) and the projection screen generation assembly such that the display assembly is capable of being programmed to create multiple show designs that may include selective projection of images (still and/or video images) onto one or more flowing-snow projection screens that may vary in their location, their size/shape (e.g., by varying height, width, thickness, and so on by operation of the projection screen generation assembly components), and their density (e.g., by varying input liquid flow and/or fan speed).

More particularly, a display or entertainment system is provided for use in low temperature venues such as outdoor winter settings. The system includes a projection screen generation assembly that includes a snow making machine. The snow making machine receives an input flow of a liquid (such as water plus one or more additives to increase opacity, its ability to freeze at higher temperatures, and/or reflectivity of the snowflakes). The machine then acts to form snow from the input flow (such as with a mister/nucleation device and a fan) and then ejects a volume of flowing snow, with the flowing snow forming a projection screen. In addition, the volume of flowing snow can be shaped by design of the output nozzle to optimize the reflected light/images and produce the desired creative look and intent. The system further includes a projector that projects light (e.g., at a brightness of over 10000 lumens or the like in some settings while other lower brightness applications may be utilized too such as smaller scale versions such as for use in consumer applications such as for holiday/winter decorations in a residential setting) onto the projection screen to provide an image on the flowing snow.

In some embodiments of the display system, the snow making machine includes a nozzle configured such that the ejected volume of flowing snow is output in a substantially planar sheet (e.g., substantially laminar flow of snowflakes to provide a highly reflective projection surface). The nozzle may have an outlet or orifice such that the planar sheet of flowing snow has a thickness proximate to the nozzle of less than about 6 inches (e.g., 2 to 4 inches or the like), and, to this end, the nozzle may include a diffuser proximate to the nozzle outlet increasing laminar flow (or the laminar or smooth nature of particle flow) in the volume of flowing snow.

The snow making machine may include a variable speed fan providing an air flow to eject the volume of flowing snow from the nozzle at an outlet velocity, and, in such cases, the display system may include a controller selectively operating the fan to vary the outlet velocity to modify height of the projection screen. The controller may also operate (concurrently or separately) to vary the input flow of the liquid to decrease or increase density of snowflakes in the volume of flowing snow, whereby opacity of the projection screen is decreased or increased. In some applications, the snow making machine is mounted for selective articulation in X and Y axes, and the controller may articulate the snow making machine concurrently (or separately) with the projector projecting light to change a location of the projection screen and of the projected image (e.g., have the image follow the moving screen or the changing shape/size of the screen).

According to another aspect, a display system is taught for providing volumetric projection of images (e.g., 3D/multiplane imagery). To this end, the system may include a first projection screen generation assembly creating a foreground projection screen at a first location and a first projector projecting a foreground image upon a surface of the foreground projection screen. Then, the system may include a second (and third, fourth, and so on) projection screen generation assembly creating a background projection screen at a second location, wherein the first and second locations are spaced apart by an offset distance (such as 1 to 5 feet or more separation between the planes of the projection screens). The system further includes a second projector projecting a background image upon a surface of the background projection screen. In this manner, the background image is behind the foreground image so as to be concurrently viewed with the foreground image as a three-dimensional and/or multiplane display (e.g., a viewer's line of sight may be through the first projection screen to the second projection screen such that they see both images with depth or volume provided by the location of the two offset projection surfaces).

In the display system, the first and second projection screen assemblies may each include a snow making machine operating concurrently such that the foreground and background projection screens each are formed of a curtain, of flowing snow. The snow making machines may be operated such that the foreground projection screen has lower opacity than the background projection screen, and, in this way, the background image is viewable through the foreground projection screen. The snow making machines may each include outlet nozzles for outputting the flowing snow curtain as a substantially planar and/or laminar flow of snowflakes. The display system may include a controller operating the first projection screen generation assembly such that the foreground projection screen at least periodically blocks portions of the background projection screen when viewed along a line of sight passing through both the projection screens (e.g., change size, opacity, and/or location of the foreground projection screen to block all or portions of the background projection screen and/or background image as part of a show or display effect).

DETAILED DESCRIPTION

Briefly, the present invention is directed to methods and systems for utilizing screens or curtains of flowing snowflakes (or snow) as a projection surface. An exemplary system includes one or more snow making devices that are operated to disperse a volume of snow that may take the form of a relatively planar sheet of flowing snow (with relatively smooth or substantially laminar flow in some cases). The flowing snow may follow a nearly vertical path (e.g., at an angle of less than about 30 degrees relative to vertical or the like) to create a vertical projection surface, and a projector, such as a high-lumen device, may project a still or motion/video image onto the projection surface. High reflectivity is provided by the snowflakes in the sheet of flowing snow, and reflectivity may be enhanced by including additives in the water or other liquid fed into the snow making machine. Opacity of the projection screen may also be increased by increasing the thickness of the snow flow leaving the nozzle/outlet orifice of the snow making machine and/or by increasing the liquid flow input into the snow making machine (e.g., increase density of snowflakes in the output stream).

Figure 1:
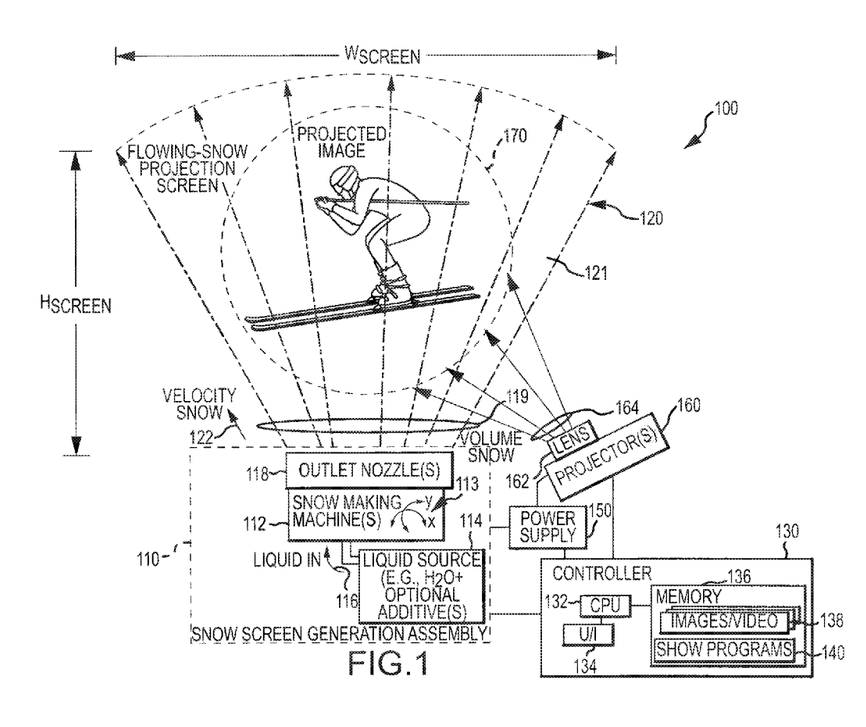
FIG. 1 is a functional block or schematic illustration of a display or entertainment system that projects still or video images onto a projection screen that is selectively formed to receive the projected images, e.g., that is formed of one or more flowing curtains or sheets of snow output from one or more snow makers or snow making machines, with the projection screen shown from the front view or from the view seen by a viewer or a member of an audience.
Figure 2:
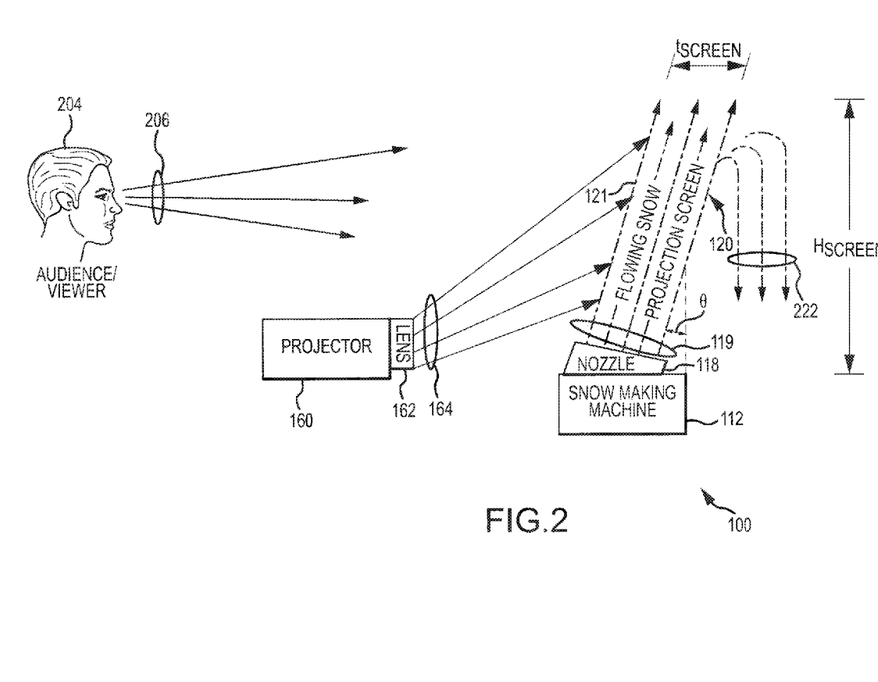
FIG. 2 is a side view of the display system of FIG. 1 illustrating that the flowing-snow projection screen has a thickness that may be selected to achieve a desired effect and is output from the nozzle(s) of the snow maker at an output angle such that a falling stream of snow (after being used as a projection surface) falls behind the projection screen (in most cases) to be hidden from view.

FIGS. 1 and 2 illustrate in functional block (or schematic) form a display system 100 that utilizes moving or flowing volumes of snow to provide a projection surface. As shown, the system 100 includes a projection screen generation assembly 110 that functions to produce a projection screen 120 with a projection surface 121 that is formed of flowing particles or particulates of snow (e.g., a volume 119 of snowflakes exiting the assembly 110 at a particular velocity 122). To this end, the assembly 110 may include one or more snow makers or snow making machines 112 each with an outlet nozzle (or nozzles) 118 configured to produce the screen 120. For example, the nozzle 118 may be sized and shaped to produce a screen 120 with a desired width, $W_{screen}$, and thickness, $t_{screen}$, at particular air flow and snow volume 119 settings for the assembly 110. The snow making machine 112 typically will also include a fan to provide air flow to achieve a desired snow velocity 122 and/or height, $H_{screen}$, for the projection screen 120.

The volume of snow 119 output from the nozzle 118 is, in part, controlled by operation of a liquid source 114 used to feed a volume 116 of liquid, $Liquid_{In}$, to the snow making machine 112. The flow rate 116 may be controlled to produce a desired snow flow 119, and this may be chosen to achieve a desired density (e.g., opacity) of the projection screen 120 (e.g., more solid or more transparent depending on the effect that is to be provided with projected image 170 such as a high definition image (more opaque/dense with more flow) or more translucent/ghost-like (less opacity/dense with less flow).

In the snow making machine 112, a mister or misting nozzles are used to eject water in mist form in into an air plenum/channel downstream from a high velocity fan, and, at proper temperatures (e.g., about freezing or less), snow particles or snowflakes are output 119 to form the screen 120. The liquid source 114 may provide a volume of water or another liquid may be utilized in some applications of system 100. Also, it may be useful to provide one or more additives to the water (or other liquid) provided, by source 114 to achieve a desired effect (e.g., change color, increase opacity, increase reflectivity, or the like) or a particular operational result. For example, an ice-nucleating agent may be added (especially useful if the nucleating agent is a white, reflective particle and the nucleating agent may be any organic or inorganic material that facilitates the water molecules to form the proper shape to freeze into an ice crystal). In some cases a material to cause freezing at higher temperature or a pigment may be added to achieve a "whiter" (e.g., or "flatter" white, which is preferred for projection applications) reflective snowflake with the assembly 110 (which may allow less flow to be used as desired reflectivity level may be reached with less snowflake density in the screen 120).

As a non-limiting example, the reflectivity (or sometimes called albedo) of the projection screen may be in the range of about 30 to about 95 percent, with a water-based snow providing lower portions of this range (unless at higher densities) and pigments or other additives being useful for achieved higher portions of this range (often at lower snowflake densities). In some cases, the snow making machine may be operated to provide snowflakes with a particular size (or other parameter) to increase reflectivity of the projection screen (e.g., by reducing the size of the snow or powder such as from 0.5 to 0.9-mm grain diameter down to 0.3-mm grain diameters that simulate fresh fine power that often has higher reflectivity).

The system 100 includes one or more projectors 160 operable to project via lens 162 light 164 to produce a projected image 170 upon the projection surface 121 of the flowing-snow projection screen 120. Each projector or projector system 160 may be a high brightness (or lumen) device such as used for projecting images in large venue water shows and architectural projections. The lenses 162 are selected based on needed or desired throws to the surface 121, and the projectors 160 would typically only be used during night time or evening shows (e.g., in low light settings). In some embodiments, digital projectors with brightness in the range of 8000 to 20000 or more lumens may be used for a projector 160 such as high a DS+10K-M projector (with a brightness rating (lumens) of 10230 ANSI) or an S+20K projector (with a brightness rating (lumens) of 20000 ANSI) available from Christie Projectors or a similar high brightness, digital projector. The projector 160 may be used to project still images in some cases (such as a banner advertisement or a background or foreground image) or to produce video or motion images.

To this end, the system 100 may include a controller 130 that functions to selectively operate the projector 160 and/or the screen generation assembly 110. The controller 130 may take many forms to practice the system 100 and may include a processor 132 for running one or more software programs such as one useful for providing a graphical user interface 134 on a monitor (e.g., to allow an operator to select a show or to manually operate the projector 160 or assembly 110) and/or a show control program 140 that may control timing/operation of the system 100 to produce a particular show or effect. The controller 130 includes memory 136 storing images/video 138 for projecting with projectors 160 (and/or images/video may be streamed in a wired or wireless mariner to controller 130). Memory 136 also stores show programs 140, but, as with the images 138, control signals may be received from a remote device. The system 100 includes a power supply 150 to provide power for the snow-screen generation assembly 110, the controller 130, and the projectors 160, and the controller 130 may selectively operate the power supply 150 to control operation of the screen generation assembly 110 and/or the projectors 160.

As shown in FIG. 2, a viewer 204 has a line of sight 206 toward the projection surface (or "front" side) 121 of the flowing-snow projection screen 120. The thickness, $t_{screen}$, may be chosen to be relatively thin such as up to 1 to 4 inches or the like (e.g., about 2 inches average thickness near the base or nozzle 118), but, in some embodiments, the thickness, $t_{screen}$, as defined in part by the size and shape of the nozzle 118 orifice, is increased so as to achieve a desired "density" of the screen 120. In other words, a quality image 170 may best be achieved with a relatively opaque screen 120 that may require a relatively thick screen 120 of flowing snow (such as more than 2 to 4 inches) such that an adequate number of snowflakes or snow surface area are available (e.g., per pixel, per square inch, or the like as measured along the line of sight 206 and/or along the projection line of light 164 from projector 160). The nozzle 118 may be angled or tipped away from the viewer 204 such that the projection screen 120 is angled away from the viewer at an offset angle, θ. Such an offset may be up to about 45 degrees (e.g., 10 to 30 degrees) and selected to cause falling snow 222 to stream downward behind the projection surface 121 (e.g., the "used" snow does not block the surface 121 during operation of the display system 100).

As will be appreciated, the height, $H_{screen}$, (as measured generally from the nozzle outlet to the top of the screen 120) and the width, $W_{screen}$, (as measured generally across the top portion) of the screen 120 may be varied to practice the system 100. In some cases, the height, $H_{screen}$, is between about 10 and 60 feet while the width, $W_{screen}$, is between about 5 and 40 feet, but these are only exemplary values that can be varied based on design and operation of the screen generation assembly 110. Interestingly, these values may be varied, such as by operation of the controller 130 based on a show program 140, during a show to change the size and/or shape of the projected image 121. Likewise, other operating parameters may be altered during operation of the system 100 to achieve desired effects. For example, the flow of liquid 116 from liquid source 114 may be altered to decrease or increase the density or opacity of the projection screen 120 (e.g., a more ghostly or foggy image 170 is provided by less flow from source 114 while a higher density screen 120 provides a sharper image 170 and each may be desired during differing portions of a show provided by system 100).

Components of the screen generation assembly 110 may be mounted to be articulated during operation of the system 100. For example, the nozzle 118 and/or machine 112 may be mounted for movement about the X and Y axes as shown with arrow 113 by the controller 130 (or another positioning device). In this way, the location of the screen 120 may be changed selectively during a show to achieve a particular effect. For example, the screen 120 may wipe or wash back and forth along like a windshield wiper (or orthogonal to a viewer's line of sight 206) and/or may be tipped forward or backward to change the offset angle, θ. These movements may be performed concurrently or separately to position the screen 120 relative to the projector 160 and/or a viewer/audience 204.

The projection screen generating assembly 110 may take many forms to practice the display system 100. Generally, the assembly includes the snow making machine 112 that is adapted for snowmaking, which is the production of snow by forcing water and pressurized air through snow gun/cannon that is shaped to provide an outlet nozzle to form the screen 120 (e.g., desire a wide by thin screen rather than simply a swirling cylinder of snow as is common on ski slopes). The snowmaker 120, for example, may include a fan, a mister/nucleation device for injecting particulate water at the fan outlet (or in an air plenum), and nucleating agents/additives, with the nozzle 118 directing the formed snow into a screen shape 120. The snowmaking machines taught in the following patents may be used to provide the snow maker 112: U.S. Pat. No. 2,676,471; U.S. Pat. No. 2,968,164; U.S. Pat. No. 3,610,527; U.S. Pat. No. 4,202,496; U.S. Pat. No. 4,214,700; U.S. Pat. No. 5,167,367; U.S. Pat. No. 5,379,937; U.S. Pat. No. 5,400,966; U.S. Pat. No. 5,836,513; U.S. Pat. No. 5,836,514; U.S. Pat. No. 6,032,204; U.S. Pat. No. 6,129,290; U.S. Pat. No. 6,793,148; and U.S. Pat. No. 7,290,722, each of which is incorporated herein in its entirety by reference. The snowmaking machines/systems may be modified to provide a nozzle 118 with or without a diffuser that is configured to produce the projection screen, and the snowmaking machines/systems taught in these patents may be adapted to provide the articulated motion shown by arrows 113 in FIG. 1.

In general these patents describe a variety of snowmaking machines and any may be used with or without modification to practice the display systems taught herein. More generally, snowmaking systems simulate nature's process of creating snow. In nature, snow is made by water vapor condensing into small ice crystals at sufficiently low temperatures and humidity. Pure water freezes below 32° F. when a few water molecules attach to one another and form what are called nucleation sites. Surrounding water molecules continue to attach to these nucleation sites and form ice crystals. This process is called homogeneous nucleation. When there are impurities (or ice-nucleating additives) in the water, heterogeneous nucleation occurs. The foreign materials serve as nucleation sites for the water molecules. Heterogeneous nucleation increases the temperature at which ice forms, which is why ice can be formed at temperatures up to 32° F. or 0° C. The temperature at which water molecules solidify into ice crystals is called the nucleation temperature. Snowmaking machines replicate this scenario using cool air, water, and sometimes additives that act as nucleators.

There are three general types of snowmaking systems: internal mix, external mix, and air/water/fan. When selecting a snowmaking system, it may be useful to consider weather conditions (wind speed, wind direction, air temperature, and humidity). The following briefly describes the three snowmaking systems. An internal mix system is an air/water system that mixes compressed air and water in an internal chamber in the snow gun nozzle. When this mixture exits the nozzle, it expands and super cools (cools to below 32° F.). Tiny water droplets freeze into ice crystals that become nucleation sites that nucleate larger unfrozen droplets, and snowflakes form.

An external mix system is another type of air/water system. This system shoots compressed air and water out of discrete orifices; the air and water mix outside the snow gun to form snow crystals. The compressed air expands and super cools some of the small droplets from the water orifices to form nucleators. The spray of the external mix system has less speed than that of an internal mix system. Therefore, snow guns using the external mix system must be mounted on towers to give the water droplets enough time to nucleate and form into snowflakes before reaching the ground.

A waterstick system is a recent version of an external mix system that eliminates use of compressed air or fan. This system uses additives and high-pressure, chilled water to create snow. An air/water/fan system (fan system) uses air from a fan instead of compressed air to suspend the droplets in air to allow enough time for them to super cool and freeze. A mechanical nucleator, sometimes made up of a small, onboard air compressor attached to a miniature internal mix snow gun, produces the nucleators that mixes with water outside the snow gun. Snow guns used in internal mix and external mix systems do not require an external source of power at the snowmaking gun location, but utilize compressors and water pumps powered at remote sites. Air/water/fan snow guns do require electric al connections to power the fan and the nucleating compressor. Internal mix and air/water/fan systems offer the highest range of operating temperatures and the greatest control of snow distribution due to use of compressed air and/or fans. External mix systems offer greater energy efficiency but have a limited range of operating temperatures. Another drawback of external mix systems is that snow distribution is affected by prevailing wind conditions.

Figure 3:
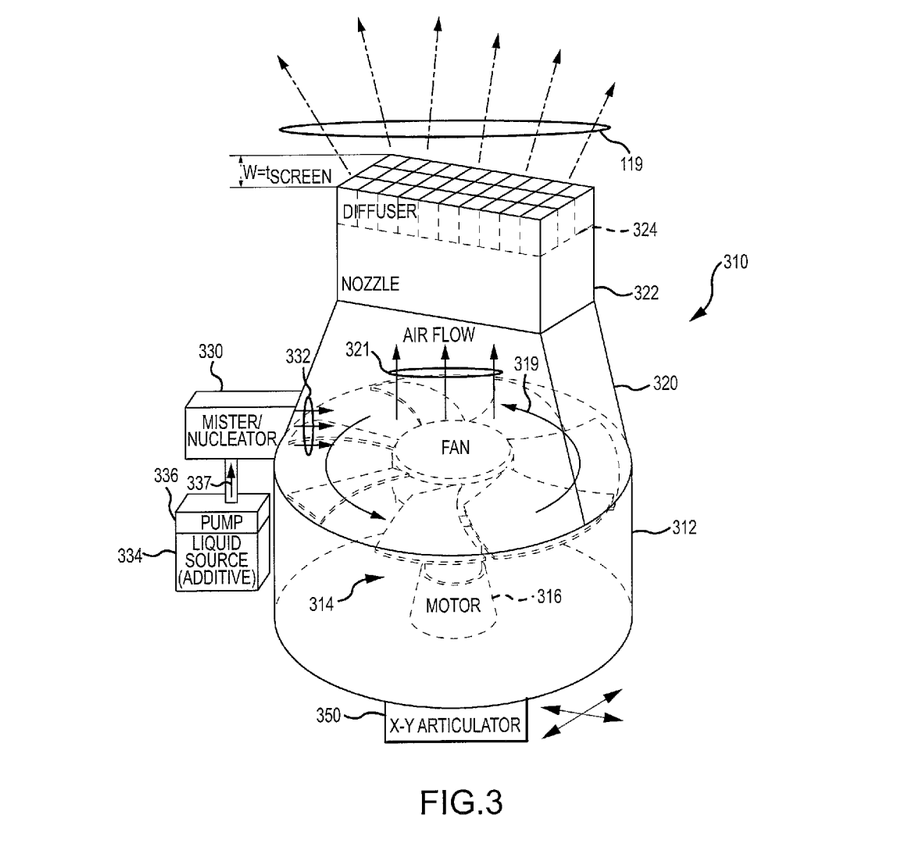
FIG. 3 illustrates an exemplary projection screen generation assembly in simplified form.

FIG. 3 illustrates in more detail an exemplary projection screen generation assembly 310 such as may be used for assembly 110 of system 100 of FIG. 1. As shown, the assembly 310 includes a base housing 312 that houses and/or supports a fan assembly 314 with a motor 316 selectively operable to rotate 319 a number of fan blades at one or more speeds. In other words, the fan shown in FIG. 3 may be rotated 319 at selected speeds to generate a desired air flow 321, and the rate of air flow 321 defines, in part, the width and height (or size and shape) of the projection screen provided by output snow 119. The air flows in an air plenum or directing channel 320 and is output through a nozzle 322 that shapes the snow 119 that is formed in the machine 310 into a sheet or curtain, e.g., a pie slice or V-shaped wedge with a thickness defined in part by width, w, of the outlet of nozzle 322. Typically, a thinner screen is useful such as less than about 6 inches thick such as about 2 inches in thickness, but a thicker screen may be useful in some cases to get desired density or opacity of the screen along the projection line, with a denser flow of snow providing a brighter reflection for a projected image (such as image 170 of FIG. 1).

In some embodiments, a diffuser 324 may be provided at the outlet/orifice of the nozzle 322 to make the output flow of snow 119 more laminar (e.g., reduce the swirling tornado-type flow typically output by a fan and as found in conventional snow makers). The diffuser 324 may take differing forms to practice the invention but is shown to include a grid or pattern of spaced apart and crisscrossing walls (e.g., defining a plurality of square or rectangular channels in this case). In other embodiments, though, the nozzle 322 itself is configured to output laminar flow 119. Generally, laminar or relatively steady airflow is desired to provide a high quality and relatively steady projection surface with the flowing snow 119. However, it may also be useful for some effects to provide bursts or jets 321 of air flow such as by slowing/stopping fan and quickly speeding it up/starting the fan. Such bursts may be tracked with the projector/projected media such as to show volcano exploding or the like as small clouds/puffs of snow are illuminated with lights/images from a projection device.

To form snow in flow 119, the assembly 310 includes a mister/nucleation device 330 that receives a flow of liquid 337, which is pumped by pump 336 (or is otherwise under pressure) from liquid source 334. The liquid may be water or another liquid and may include one or more additives such as ice-nucleating agents (such as dirt) or pigment materials. The mister 330 injects the liquid as mist 332 into the air plenum or output 320 of the illustrated fan (e.g., into air flow 321), and, with temperatures below a threshold snowmaking temperature, snowflakes are formed and forced to flow outward 119 of machine/assembly 310 via nozzle 322 and diffuser 324. In this manner, a laminar sheet or curtain of snow is provided by the assembly 310. To allow the projection screen formed by flow 119 to be positioned within a space, the assembly 310 includes an X-Y actuator 350 that allows the housing 312 (and connected nozzle 322) to be pivoted in two directions. This causes the screen provided by flowing snow 119 to be dynamic (control where spray of snow goes in real time or part of a show), to move back and forth to increase or change a width of the projection surface, and/or to be repositioned to place the projection surface in a desired location relative to the projector(s).

In some embodiments, it may be desirable to provide volumetric or more three-dimensional (3D) displays. This may be achieved in some cases with a single projection screen with multiple projectors. However, in other cases, volumetric projection (or projected components that appear to be floating ahead of other projected components) is achieved by two or more projection screens that are in differing planes (offset projection surfaces) and two or more projectors that are project images onto the differing planes. In this manner, for example, a background image may be projected on one flowing-snow projection screen while a foreground image is projected at least partially concurrently with the background image on a second flowing-snow projection screen that is positioned in front of the first screen (e.g., closer to the viewer/audience). In one case, a still or video image is projected as a background image on a rear projection screen and a still or video image is projected onto the foreground image on a front/forward projection screen (e.g., one that is a one to five or more feet in front of the rear projection screen).

Figure 4:
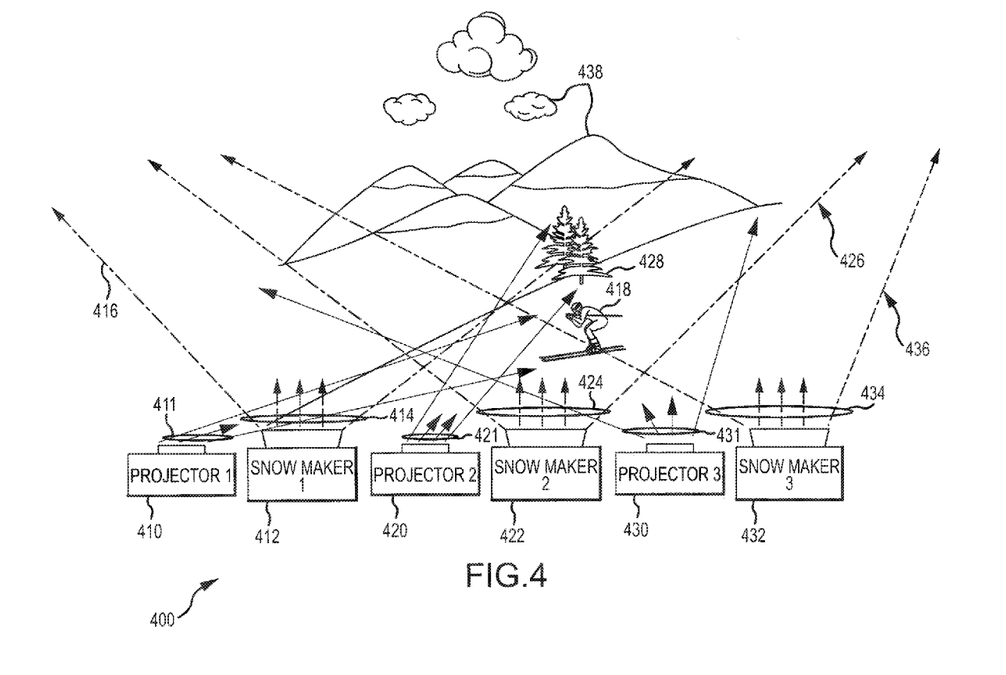
FIGS. 4 and 5 are functional block diagrams of a volumetric display system showing the use of projection screens (of water, snow, or the like) in offset planes to provide a 3D or volumetric effect with a like number of projectors projecting images on each screen.
Figure 5:
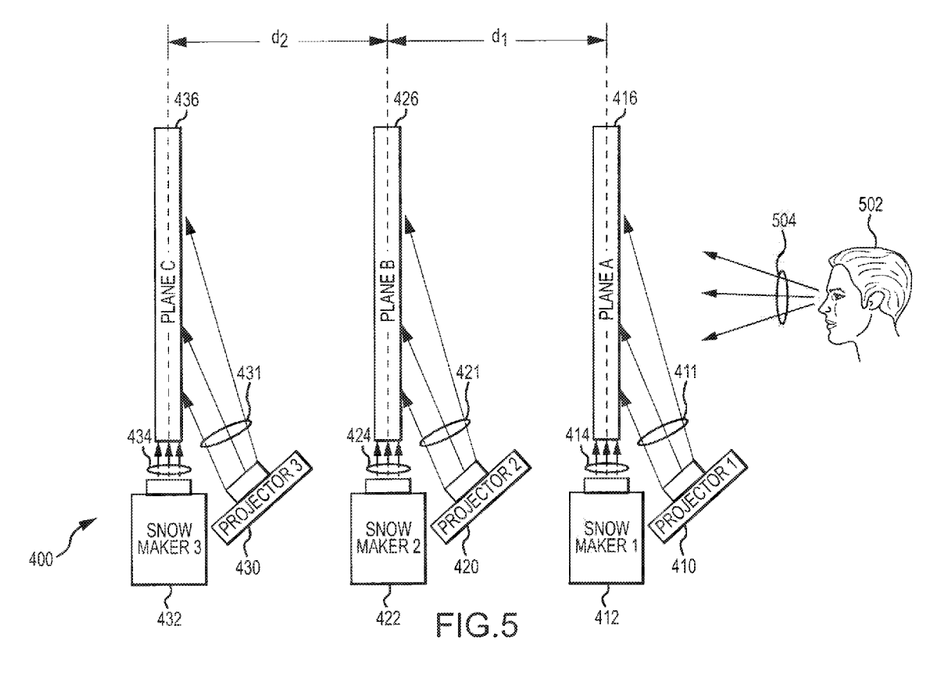

FIGS. 4 and 5 illustrate a display system 400 adapted for providing 3D or a volumetric projection/display. The system 400 is adapted for projecting three images (still and/or moving/video images) in three differing and offset planes (shown a Plane A, Plane B, and Plane C in FIG. 5). A first snow maker 412 is used to provide a stream of snow 414 to generate a first flowing-snow projection screen 416, and this screen 416 is substantially planar as shown with Plane A in FIG. 5. A first projector 410 projects light 411 onto the screen 416 to provide a first or foreground projected image 418 (e.g., a video of a swooshing snowboarder).

A second snow maker 422 is included in system 400 to provide a stream of snow 424 that generates a second flowing-snow projection screen 426. The screen 426 is substantially planar as shown with Plane B in FIG. 5. The screen 426 is offset from the first or foreground screen 416 by a first distance, $d_1$, as measured along a line of sight 504 of a viewer (or member of an audience for system 400). A second projector 420 projects light 421 onto the screen 426 to provide a second or midground/midrange projected image 428 (e.g., a still or video image of objects for behind the snowboarder such as trees). In one embodiment, the first offset distance, $d_1$, is selected from the range of 1 to 30 feet (with 15 to 25 feet used in some cases).

To provide even more volume or depth to a viewer 502, the display system 400 includes a third snow maker 432. The snow making machine 432 provides a stream of snow 434 that generates a third flowing-snow projection screen 436. The screen 436 is substantially planar as shown with Plane C in FIG. 5. The screen 436 is offset from the second or middle screen 426 by a second offset distance, $d_2$, as measured along a line of sight 504 of a viewer (or member of an audience for system 400). A third projector 430 projects light 431 onto the screen 436 to provide a third or background projected image 438 (e.g., a still or video image of scenery here shown as mountains and clouds behind the trees 428 and snowboarder 418). In one embodiment, the second offset distance, $d_2$, is selected from the range of 1 to 30 feet (with 15 to 25 feet used in some cases).

The projectors 410, 420, 430 may be directed (such as by selection and focusing of lenses) to project generally in the same area or space such that images 418, 428, 438 overlap from the point of view 504 of viewer 502. In such cases, the projection screens may have differing density such as more dense/opaque screens provided further away from the viewer such as the foreground screen 416 being the least dense/opaque, midscreen 426 being more dense, and background screen 436 being more/most dense/opaque, such as via operation of the snow makers 412, 422, 432 (more flow for more opacity or a thicker screen to provide more density of snowflakes or the like). In this manner, the foreground image 418 is more ghostly than the midrange image 428 and background image 438 to allow viewing of the rear or more distal images.

In other cases, the images 418, 428, 438 do not overlap or only partially overlap and in such cases the screens 416, 426, and 436 may be of the same or differing densities/opacities to achieve desired effects (e.g., make the background less dense/reflective to appear further away or the like). In either event, the screens 416, 426, 436 typically may appear as a single screen to the viewer 502, with depth or volume being provided by the screen offset distances, $d_1$ and $d_2$. In some embodiments, one or the snow makers 412, 422, 432 (or its corresponding projector 410, 420, 430) may be varied in its operation during a show/display to create a desired effect such as to show or block a screen/image behind the screen (e.g., via operation of snowmaker 412, 422 to increase size/height and/or to increase opacity).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In the above description, the term "snow" is intended to be understood relatively broadly to include crystallized ice (frozen or partially frozen) particles that may have the physical integrity and strength to maintain their shape. Snow is generally white because it is a bunch of individual ice crystals arranged together. When a light photon enters a layer of snow in a projection screen described herein it goes through an ice crystal on the top, which changes it direction slightly and sends it on to a new or next ice crystal in the projection screen that does the same thing. The crystals bounce the light around such that it comes back out of the flowing-snow projection screen, and it does so to all different light frequencies so all colors of light are bounced back (e.g., the screen is opaque or has higher opacity). Hence, the "color" of all the frequencies in the visible spectrum combined in equal measure is white so that without projected light from a projector the screen would appear as a white screen and so that the curtain or screen of flowing snow makes a good projection surface as it reflects colors of the projected light back to a viewer (when of an adequate density or when a large enough number of snowflakes are provided in the projection screen).

The media or images displayed with the flowing-snow projection screens may be varied widely to practice the invention. Specifically, there are many advertising applications for the described invention as the flowing-snow may be used to create temporary and variable billboards such as at a winter entertainment venue, at other settings during the winter/colder months, or along a highway or higher traffic area (e.g., outside a shopping mall or the like). For example, in winter or lower temperature locations, a company or other advertiser could place one of the described systems/units on a hill side, road side, in an open area near traffic, on a skyscraper, or other visible location and do nighttime billboard-like advertising (e.g., eye-catching advertising for nearly any product or service) with a flowing-snow projection screen.

I claim:

1. A display system for low temperature venues, comprising:
   a projection screen generation assembly comprising a snow making machine receiving an input flow of a liquid, forming snow from the input flow, and ejecting a volume of flowing snow, wherein the flowing snow forms a projection screen; and
   a projector projecting light onto the projection screen to provide an image on the flowing snow.

2. The display system of claim 1, wherein the snow making machine includes a nozzle configured such that the ejected volume of flowing snow is output in a substantially planar sheet.

3. The display system of claim 2, wherein the planar sheet of flowing snow has a thickness proximate to the nozzle of less than about 6 inches.

4. The display system of claim 3, wherein the nozzle comprises a diffuser proximate to a nozzle outlet increasing laminar flow in the volume of flowing snow and wherein the thickness of the planar sheet is less than about 4 inches.

5. The display system of claim 1, wherein the liquid comprises water with an additive selected to increase reflectivity.

6. The display system of claim 1, wherein the snow making machine comprises a variable speed fan providing an air flow to eject the volume of flowing snow from the nozzle at an outlet velocity and wherein the display system includes a controller selectively operating the fan to vary the outlet velocity to modify height of the projection screen.

7. The display system of claim 6, wherein the controller operates to vary the input flow of the liquid to decrease or increase density of snowflakes in the volume of flowing snow, whereby opacity of the projection screen is decreased or increased.

8. The display system of claim 1, wherein the snow making machine is mounted for selective articulation in the X and Y axes and wherein the display system includes a controller articulating the snow making machine concurrently with the projector projecting light to change a location of the projection screen and of the projected image.

9. The display system of claim 8, wherein the projector is operated to track a location of the projection screen such that the projected image is projected on the projection screen at a new location based on the articulation of the snow making machine by the controller.

10. A display system for providing volumetric projection of images, comprising:
    a first projection screen generation assembly creating a foreground projection screen at a first location;
    a first projector projecting a foreground image upon a surface of the foreground projection screen;
    a second projection screen generation assembly creating a background projection screen at a second location, wherein the first and second locations are spaced apart by an offset distance; and
    a second projector projecting a background image upon a surface of the background projection screen, wherein the background image is behind the foreground image to be concurrently viewed with the foreground image as a three-dimensional display,
    wherein the first and second projection screen assemblies each comprise a snow making machine and
    wherein the foreground and background projection screens each comprise a curtain of flowing snow.

11. The display system of claim 10, wherein the snow making machines are operated such that the foreground projection screen has lower opacity than the background projection screen, whereby the background image is viewable through the foreground projection screen.

12. The display system of claim 10, wherein the snow making machines each comprise outlet nozzles for outputting the flowing snow curtain as a substantially planar and laminar flow of snowflakes.

13. The display system of claim 10, further comprising a controller operating the first projection screen generation assembly such that the foreground projection screen at least periodically blocks portions of the background projection screen when viewed along a line of sight passing through both the projection screens and wherein the offset distance is at least about 5 feet.

14. An apparatus for providing winter entertainment, comprising:
    a snow maker comprising a fan producing an air flow, a liquid source providing a flow of a liquid, a mister injecting the liquid as mist into the air flow, and a nozzle for ejecting a sheet of flowing snow; and
    a projection device projecting light onto a surface of the sheet to produce a projected image on the sheet surface.

15. The apparatus of claim 14, wherein the nozzle directs the sheet of flowing snow upward in a substantially vertical direction and wherein the sheet surface includes a substantially laminar flow of snowflakes moving upward.

16. The apparatus of claim 14, further comprising a controller selectively operating the fan to alter the air flow and operating the liquid source to alter the flow of the liquid, whereby a shape and opacity of the sheet of flowing snow are modified.

17. The apparatus of claim 14, wherein the liquid comprises water and at least one additive, whereby snowflakes in the flowing snow have higher reflectivity or opacity relative to snowflakes formed from only water.

18. The apparatus of claim 14, further comprising an actuator for pivoting one or more components of the snow maker to adjust a position of the sheet of flowing snow relative to the projection device.

19. The apparatus of claim 14, wherein the projection device comprises a high-lumen projector providing the projected image at a brightness of at least about 10000 lumens and wherein the projected image comprises a still or a video.

* * * * *